PLANAR MULTI-CHANNEL FIELD-EFFECT TRIODE
Filed Aug. 18, 1964
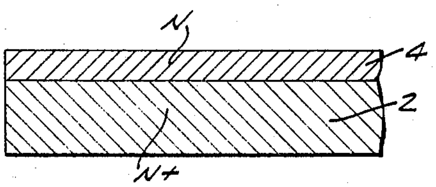
FIG. 1.
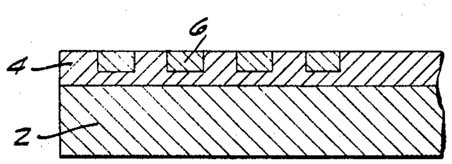
FIG. 2.
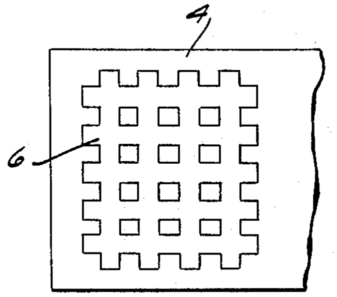
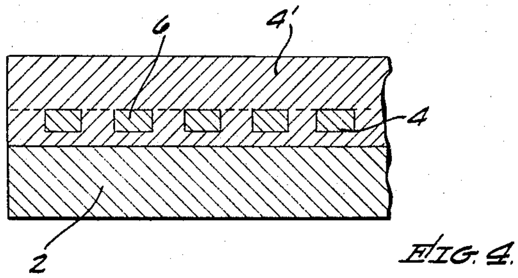
FIG. 4.
FIG. 3.
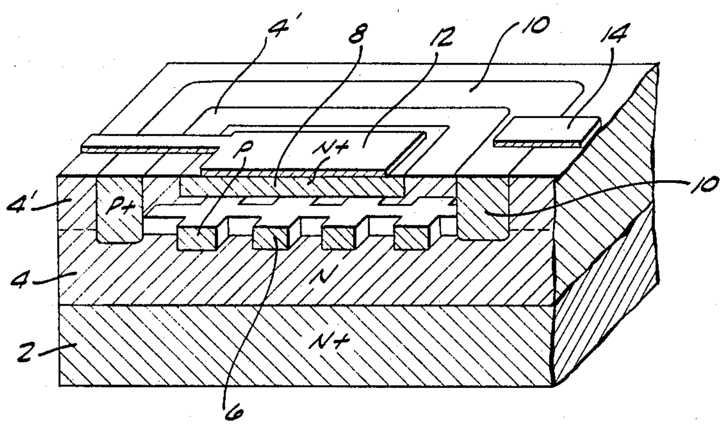
FIG. 5.
INVENTORS.
RAINER ZULEEG,
VERDA O. HINKLE JR.,
BY W. Hume Allister Jr.
ATTORNEY.

United States Patent Office 3,381,188
Patented Apr. 30, 1968

3,381,188

PLANAR MULTI-CHANNEL FIELD-EFFECT TRIODE

Rainer Zuleeg, Newport Beach, and Verda O. Hinkle, Jr., Huntington Beach, Calif., assignors to Hughes Aircraft Company, Culver City, Calif., a corporation of Delaware Filed Aug. 18, 1964, Ser. No. 390,292
8 Claims. (Cl. 317—235)

This invention relates to novel high frequency solid-state electronic devices and to methods for fabricating such devices. More particularly, the invention relates to field-effect solid-state active devices such as rectifiers and amplifiers. As used herein the term "active device" means any solid-state electronic device which can alter one or more characteristics of an electrical signal applied thereto in a controllable and reproducible fashion in contrast to a "passive device" which does not controllably alter the characteristics of an electrical signal applied thereto or transmitted thereby.

Active field-effect semiconductor devices, sometimes called "unipolar" or "analog" transistors, are known. A thin-film form of such a transistor is described in my co-pending application, Ser. No. 634,395 which is a continuation of Ser. No. 258,081, now abandoned, filed Feb. 12, 1963, and assigned to the instant assignee. Unipolar or analog transistors have also been described by W. Shockley in an article entitled "Transistor Electronics: Imperfections, Unipolar and Analog Transistors" published in the November 1952 Proceedings of the I.R.E. (vol. 40, No. 11) at page 1289 and especially at page 1311. Because of both the techniques for forming such devices and because of their extremely small dimensions, the fabrication of complete solid-state circuits, including passive as well as active functions, has become of increasing importance and has given rise to a whole new art called variously, solid circuitry, micro-circuitry, integrated circuitry, or micro-electronics. Such circuitry is possible because of the ability to form thin films by vapor-deposition, masking, and solid-state diffusion techniques which films are capable of controllably providing such functions as rectification, amplification, resistance, capacitance, and inductance, in a single integrated structure. Thus amplification can be provided by vapor-depositing a metallic electrode, which may be called a "source", upon a substrate and then depositing a layer of a semi-insulator material upon the "source" electrode. A "drain" or collector electrode is then formed by depositing a thin metallic film on the semi-insulator body. Likewise by masking and vapor-deposition techniques an additional metallic "gate" or control electrode in the form of a grid, for example, may be disposed in the semi-insulator body between the source and drain electrode films. Thus the flow of majority charge carriers from the source to the drain electrode through the semi-insulator body may be controlled by the field therein established by a signal on the gate electrode. Such devices are closely analogous to vacuum tube devices (hence the term "analog" transistors) except that in these field-effect devices the charge carriers flow from cathode (source) to anode (drain) in a solid medium generally called a semi-insulator. In order to provide a convenient distinction between semiconductor transistors utilizing rectifying junctions or point contacts to achieve rectification or amplification, the unipolar transistor devices to which the present invention relates its referred to herein as a field-effect triode device. In comparison with semiconductor devices of the junction type in which charge carriers already available in the semiconductor body are injected across a junction between regions of opposite conductivity, the charge carriers in the field-effect triode device of the present invention are normally not available in the body of semi-insulator and are injected thereinto by and from the aforementioned source electrode.

In the co-pending application of R. Zuleeg, Ser. No. 633,638 which is a continuation of Ser. No. 333,127, now abandoned, filed Dec. 24, 1963, and assigned to the instant assignee, such a field-effect triode device is described which comprises a grid of N-type material, for example, embedded in a body of P-type silicon which grid serves as the "gate" electrode between the "source" and "drain" electrodes which, in one embodiment, are constituted by metallic films disposed on opposite surfaces of the silicon body. In this device the current flowing from the source electrode to the drain electrode through the body of semi-insulator material is controlled by impressing an appropriate signal on the N-type grid gate. This signal establishes an electric field around the grid so as to effectively suppress or close-off the flow of majority charge carriers through the interstices of the grid from the source to the drain electrodes.

It will be appreciated that maximum usefulness and effectiveness of such a device is achieved only by confining the current flowing from the source to the drain to the channel or channels of the grid which are controlled by the electric field establisched thereon by the grid signal. In integrated circuitry, where such a device may be disposed on a fairly extensive semi-insulator body, such confinement may be a difficult achievement since the source-drain current may continue to flow around the grid and not through it.

It is, therefore, an object of the present invention to provide an improved field-effect solid-state electrical device.

Another object of the invention is to provide an improved field-effect triode device.

Another object of the invention is to provide an improved field-effect triode device having a grid gate electrode and means for confining current flow through the gate electrode.

Yet another object of the invention is to provide an improved field-effect triode device for use in microelectronic integrated circuitry which can be fabricated as an integral part of such circuitry, and which device has means for isolating its current flow between its input and output electrodes.

These and other objects and advantages of the invention are attained by providing a current channel-confining "guard" electrode or ring in a body of semi-insulator material and laterally around the grid gate electrode in a field-effect triode device. This guard-ring is formed of semi-insulator material of opposite conductivity-type to that of the semi-insulator body itself. In a typical embodiment, N-type semi-insulator material may be disposed between a pair of electrically conductive members constituting the source and drain electrodes of the device. A P-type grid of semi-insulator material is embedded in the semi-insulator body between the source and drain electrodes. A ring of P-type semi-insulator material is formed in the N-type semi-insulator body and extends from a surface thereof down into the body so as to literally wall-in or surround the P-type grid. By this guard-ring, current flowing in the field-effect triode device is confined to the channels of the grid thus providing more effective control or "pinch-off" thereof by the grid gate as well as higher transconductance. By connecting the guard-ring to the grid electrode a top-surface connection and contact area to the embedded grid may also be obtained.

The invention will be described in greater detail by reference to the drawings in which:

FIGURE 1 is a cross-sectional elevational view of a field-effect triode device according to the invention in an initial stage of fabrication thereof;

FIGURE 2 is a cross-sectional elevational view of the field-effect triode device shown in FIGURE 1 at a subsequent stage in the fabrication thereof;

FIGURE 3 is a plan view of the field-effect triode device shown in FIGURE 2;

FIGURE 4 is a cross-sectional elevational view of the field-effect triode device shown in FIGURES 2 and 3 at a further subsequent stage in the fabrication thereof; and FIGURE 5 is a perspective view partly in section of a field-effect triode device according to the invention.

In connection with the field-effect triode devices according to the present invention, the term "semi-insulator" refers to and means any material which at room temperature has a low intrinsic majority carrier concentration so that at room temperature the material exhibits low electrical conductivity. In general, any material which exhibits an energy gap of at least about 1.0 ev. is satisfactory for the semi-insulator element in the devices of the present invention. Suitable materials are silicon and compounds of the elements from the Third with elements from the Fifth Columns of the Periodic Table of the Elements such as: aluminum phosphide, aluminum arsenide, aluminum antimonide, gallium phosphide, gallium arsenide, indium phosphide; also satisfactory are compounds of the elements from the Second Column with elements from the Sixth Column of the Periodic Table of the Elements such as: zinc sulfide, zinc selenide, zinc telluride, cadmium sulfide, and cadmium selenide, cadmium telluride, and mercury sulfide. Silicon carbide is also a suitable semi-insulator material for the purposes of the present invention. While any of the aforementioned materials may be used to advantage in the practice of the invention, description herein will be confined primarily to the use of silicon as an exemplary material.

As shown in FIGURE 1, a substrate member 2 of high conductivity N-type silicon, for example, is provided for supporting the field-effect triode device to be fabricated. Although such a device may comprise a body of semi-insulator material sandwiched between metallic layers which may serve as source and drain electrodes, it is not essential that these electrodes be metallic. As taught in the aforementioned co-pending application of R. Zuleeg (S.N. 333,127 filed Dec. 24, 1963), the source and/or drain electrodes may be formed of highly conductive semi-insulator material.

Because of the great difficulty in vapor-depositing silicon upon substrate surfaces of materials other than silicon itself, the fabrication of a field-effect triode device utilizing silicon as the semi-insulator material is facilitated by the employment of a substrate of silicon which, according to the embodiment shown may also conveniently serve as the source electrode. Thus, silicon may be conveniently deposited upon silicon, making it feasible to form at least the lower or source electrode and substrate of silicon which has been heavily-doped so as to be an effective electrical conductor. It is known that by heavy doping of a semi-insulator body, such body can be converted to degenerative semi-insulator material which means that the body has such a concentration of impurity therein as to cause it to lose its semi-insulator characteristics and to behave as a more conventional electrical conductor. The silicon semi-insulator material constituting the device body proper may then be deposited upon this degeneratively-doped silicon.

To achieve the arrangement shown in FIGURE 1 several methods of fabrication are available. A body of semi-insulator material having the resistivity desired for the field-effect device may be initially provided. By diffusion one portion of the body may be doped to degeneracy to thus form a source electrode member and substrate 2 while leaving the opposite surface portion unchanged in resistivity so as to constitute a first device body portion 4 as shown. Alternatively, a substrate and source electrode member 2 of high conductivity semi-insulator material may be initially provided and, as will be described in greater detail hereinafter, by an epitaxial process the first device body portion 4 may be formed on the substrate-electrode 2.

For convenience, and solely for purposes of illustration, the device semi-insulator body in this embodiment of the invention may be referred to as being of N-type conductivity due to an excess of majority charge carriers (i.e., electrons) therein. The grid gate electrode member 6 may be referred to as being of P-type conductivity due to a deficiency of majority charge carriers (i.e., electrons) therein. It will be understood that such conductivity conditions are usually established by the incorporation of certain impurity elements into the bulk semi-insulator material. Thus silicon, for example, may have any one of such impurity elements as arsenic, antimony, or phosphorus incorporated therein to establish N-type conductivity since these elements contribute an excess of electrons to the silicon for current conduction. P-type silicon may have any one of such impurity elements as aluminum, boron or indium incorporated therein to establish P-type conductivity since these elements lack an excess of electrons for current conduction. The process of incorporating such impurity elements into the crystal lattice structure of semiconductor materials is well known and is commonly referred to as "doping" and may be achieved by diffusing or alloying the impurity into the semiconductor body or by including such impurity in the melt from which the semiconductor crystal body is grown.

According to the invention, the gate electrode member 6 may be of semi-insulator material and, as has been mentioned previously, of the same material as the semi-insulator body 4 although of different conductivity type. Thus, if as described the semi-insulator body 4 is of N-type conductivity, the gate electrode member 6 may be of P-type conductivity.

Referring to the drawings, the fabrication of a field-effect triode device according to the invention having a grid gate electrode 6 may be achieved by diffusing an acceptor conductivity-type-determining impurity through a suitable mask upon the surface of the N-type layer 4. The mask may be formed by oxidizing the surface of the silicon layer 4 then removing portions of the oxide corresponding to the dimensions and pattern of the grid to be formed. The formation of such an oxide mask may be achieved by photo-resist and etching techniques as is well known in the art. Diffusion of the acceptor impurity is then achieved so as to form a grid 6 of P-type silicon material in the N-type silicon layer 4. Thereafter the oxide mask is entirely removed leaving the structure shown in FIGURES 2 and 3. These oxide masking and diffusion techniques are well known in the art and reference is made to U.S. Patent Nos. 2,802,760 to Derick and Frosch and 3,025,589 to Hoerni for a complete, detailed description thereof.

A layer 4' of N-type silicon may then be epitaxially deposited upon the P-type grid 6 and the exposed portions of the N-type layer 4. In this process the silicon may be formed by the epitaxial process and caused to deposit upon the N-type layer 4 by the simultaneous reduction in hydrogen of phosphorus trichloride and silicon tetrachloride at a temperature of from 1200–1300° C. The epitaxial process is well known and fully described by H. C. Theuerer in the Journal of the Electrochemical Society (1961, vol. 108 at page 649) and by A. Mark in the same Journal (1961, vol. 108 at page 880).

Thereafter, the upper surface of the N-type layer 4' may be masked as by oxidizing this surface and then removing a loop or ring of the oxide of a diameter sufficient to encompass or surround the underlying gate electrode 6.

The assembly is then exposed to an atmosphere containing the vapors of a P-type conductivity-type-determining impurity, such as boron, for example, which impurity, by the process of diffusion into the exposed N-type silicon surface through the annular opening in the oxide mask, converts an annular portion 10 of surface and near-surface portions of the exposed silicon to P-type conductivity thus forming a P-type guard ring 10 which extends down into the semi-insulator body after which the upper surface of the semi-insulator body may be closed or sealed-off to the atmosphere by re-oxidizing the exposed portions of the semi-insulator body.

The drain electrode layer or member 8 may then be formed by removing a portion of the oxide mask and diffusing into the exposed portion of the N-type layer 4' a donor impurity such as arsenic thus forming the layer 8 of high conductivity material therein.

After the drain diffusion step has been completed, portions of the remaining oxide film may be removed as by etching the same with hydrofluoric acid so as to provide exposed areas of the drain electrode layer 8 and the ring guard member 10 which areas permit electrical connections to be made thereto.

The complete device is shown in FIGURE 5 and includes a drain electrode member 8 comprising a layer of high conductivity N-type silicon, a source electrode member 2 comprising also a layer of high conductivity N-type silicon, and a semi-insulator body 4, 4' of lower conductivity N-type silicon in which is embedded a P-type grid gate electrode member 6 surrounded by a high conductivity P-type channel-confining wall or ring 10. In this device the current flowing from the electrode layer 2 to the electrode layer 8 through the N-type silicon material 4 and 4' may be controlled by impressing any desired signal on the P-type grid 6. An appropriate voltage signal on the grid 6 will establish a space-charge region around the N-type openings or channel portions of the grid, the width of which space-charge region or regions is variable and controllable in accordance with the grid signal. Hence, the channels for the flow of majority charge carrier current through the grid are of variable and controllable cross-sectional area thus permitting one to effectively regulate and suppress or "pinch-off" the flow of such current as desired. The P-type wall or guard-ring 10 will confine the source-drain current to the portions of the semi-insulator body 4, 4' between the source and drain electrodes 2 and 8 thus subjecting substantially all of this source-drain flow to effective control by grid gate member 6.

The device of FIGURE 5 may also be provided in the reverse polarity, that is, the grid 6 may be composed of N-type material and the semi-insulator body 4, 4' of P-type material in which case the source and drain electrodes 2 and 8 would be composed of high conductivity P-type material, while the guard-ring 10 would be of high conductivity N-type material.

While the drain electrode 8 has been described as being formed by diffusion, this is not the only way in which this electrode may be fabricated. Alternatively, it is possible to deposit a predetermined quantity of gold and antimony (say 1% antimony) on the surface of the semi-insulator body and to heat the assembly for a short time (say one or two minutes) at a temperature of from 300–500° C. so as to alloy the gold-antimony to the silicon material thus forming the high conductivity drain electrode 8. In some instances this alloying technique may be preferred over diffusion because of the relatively short time required to form the alloy region in contrast to diffusion processes which often are long enough and of high enough temperatures to cause other regions of the device to undergo undesired further diffusion.

While a grid of rectilinear geometry has been shown, it is not necessary that the grid shape be so restricted. In some instances a grid formed so as to provide round or circular channels may be preferred since such round channeled grids are capable of pinching-off the current flow with only half of the voltage required for grids having a square channel configuration. The significance of the geometry or shape of the channels in the grid will be appreciated when it is understood that the pinch-off voltage is determined by the following expression for round channels:

$$V_{PO}=\frac{D^2}{16\epsilon\,\epsilon_0\mu\rho}$$

where D is the diameter of the channel, $\epsilon$ is the relative dielectric constant of the semi-insulator material in the channel, $\mu$ is the mobility of the charge carriers in the channel, $\rho$ is the resistivity of the semi-insulator material in the channel, and $\epsilon_0$ is the permittivity of vacuum.

In contrast, the pinch-off voltage ($V_{PO}$) for a square channel device is determined according to the following expression:

$$V_{PO}=\frac{D^2}{8\epsilon\,\epsilon_0\mu\rho}$$

While it may be feasible to provide separate electrical connection to the grid gate electrode 6 and to the guard-ring 10, it is convenient to form the guard-ring 10 so that it extends down into the semi-insulator body and contacts a portion or portions of the gate electrode 6. This then permits one to make an electrical connection to the gate 6 and to the drain electrode 8 on the top surface of the field-effect device as shown in FIGURE 5, which is of extreme advantage in integrated circuitry. It is also possible to make a top contact connection to the source electrode 2, if desired. These electrical connections may be in the form of vapor-deposited metallic films. As shown an electrical connection to the drain electrode region 8 is provided by such a deposited metallic layer 12, the guard-ring region 10 having been provided in this embodiment with an overlying oxide or other insulating film so as to permit the drain connection 12 to extend thereover without making electrical contact to the guard-ring region. Electrical connection to the guard-ring region 10 is similarly provided by a deposited layer of metal 14. Such deposited metallic layers may be insulated from any underlying electrode region except that to which it is desired to make the connection by and insulative layer or oxide, for example, of the semi-insulator material. Such oxide or insulating layers are not shown in the drawings solely in an effort to preserve clarity of illustration and to eliminate the unnecessary complexity associated with excessively detailed drawings.

What is claimed is:

1. A field-effect triode device comprising:
(a) a body of semi-insulator material of a first conductivity type;
(b) a control electrode member in the form of a grid of semi-insulator material of a second type of conductivity opposite to said first type disposed in and surrounded on substantially all surfaces by said body of semi-insulator material;
(c) electrically conductive electrode members disposed on opposite surfaces of said body of semi-insulator material and in electrical contact therewith;
(d) and a region of semi-insulator material of said second type of conductivity disposed on a surface of said body of semi-insulator material and extending down thereinto so as to surround said control electrode member and make electrical contact with a portion thereof, said control electrode member being spaced from said region by said body of semi-insulator material except for the portion contacted by said region.

2. A field-effect triode device comprising:

(a) a body of semi-insulator material of a first conductivity-type;

(b) a control electrode member in the form of a grid of semi-insulator material of a second type of conductivity opposite to said first type disposed in and surrounded on substantially all surfaces by said body of semi-insultaor material;

(c) input and output electrode members comprising degeneratively-doped, electrically conductive, opposed surface portions of said semi-insulator body and in electrical contact therewith;

(d) and a region of semi-insulator material of said second type of conductivity disposed on a surface of said body of semi-insulator material and extending down thereinto so as to surround said control electrode member and make electrical contact with a portion thereof, said control electrode member being spaced from said region by said body of semi-insulator material except for the portion contacted by said region.

3. A field-effect triode device comprising:

(a) a body of semi-insulator material of a first conductivity-type;

(b) a control electrode member in the form of a grid of semi-insulator material of opposite conductivity-type to that of said body of semi-insulator material, said control electrode member being disposed in and surrounded on substantially all surfaces by said body of semi-insulator material;

(c) electrically conductive source and drain electrode members disposed on opposite surfaces of said body of semi-insulator material and in electrical contact therewith;

(d) and a region of semi-insulator material of said opposite conductivity-type disposed on said surface of said body of semi-insulator material on which said drain electrode is disposed, said region extending down into said body of semi-insulator material so as to surround said control electrode member and make electrical contact with a portion thereof, said control electrode member being spaced from said region by said body of semi-insulator material except for the portion contacted by said region.

4. The invention according to claim 3 wherein said source and drain electrode members are provided by high conductivity surface portions of said semi-insulator body.

5. A field-effect triode device comprising:

(a) a pair of outer electrically conductive layers;

(b) a body of semi-insulator material of a first conductivity-type disposed between said pair of outer conductive layers;

(c) an inner control electrode member in the form of a grid of semi-insulator material of opposite conductivity type to said first type surrounded on substantially all surfaces by said body of semi-insulator material;

(d) and a ring of semi-insulator material of a conductivity-type opposite to said first conductivity-type disposed on a surface of said semi-insulator body and extending down thereinto so as to surround said control electrode member and make electrical contact with a portion thereof, said inner control electrode member being spaced from said ring by said body of semi-insulator material except for the portion contacted by said ring.

6. A field-effect triode device comprising:

(a) a pair of outer electrically conductive members;

(b) a body of N-type semi-insulator material disposed between said pair of outer conductive members and in electrical contact therewith;

(c) an inner control electrode member in the form of a grid of P-type semi-insulator material disposed within and surrounded on substantially all surfaces by said body of N-type semi-insulator material;

(d) and a region of P-type semi-insulator material disposed on a surface of said N-type semi-insulator body and extending down thereinto so as to surround said P-type control grid and make electrical contact with a portion thereof, said P-type control grid being spaced from said region of P-type semi-insulator material by said body of N-type semi-insulator material except for the portion contacted by said P-type region.

7. A field-effect triode device comprising:

(a) a body of semi-insulator material having a first type of conductivity and of predetermined resistivity;

(b) a first layer of semi-insulator material disposed on a first surface of and integral with said body of semi-insulator material, said first layer being of said first type of conductivity and of lower resistivity than said predetermined resistivity and in electrical contact with said body of semi-insulator material;

(c) a second layer of semi-insulator material disposed on a second surface of and integral with said body of semi-insulator material, said second layer being of said first type of conductivity and of lower resistivity than said predetermined resistivity and in electrical contact with said body of semi-insulator material;

(d) an internal region of said semi-insulator body being disposed in and surrounded on substantially all surfaces by said semi-insulator body between said first and second layers and in the form of a grid of semi-insulator material of a second type of conductivity opposite to said first type;

(e) and a region of said semi-insulator body having said second type of conductivity disposed on a surface thereof and extending down into said semi-insulator body so as to surround said internal region thereof and making electrical contact with a portion of said internal region, said internal region being spaced from said last-named region by said body of semi-insulator material except for the portion contacted by said last-named region.

8. A field-effect triode device comprising:

(a) a body of N-type semi-insulator material having a predetermined resistivity;

(b) a first region of N-type semi-insulator material disposed on a first surface of and integral with said body of N-type semi-insulator material but of lower resistivity and in electrical contact with said body of semi-insulator material than said predetermined resistivity;

(c) a second region of N-type semi-insulator material disposed on a second surface of and integral with said body of N-type semi-insulator material and of lower resistivity and in electrical contact with said body of semi-insulator material than said predetermined resistivity;

(d) an internal region of said semi-insulator body being disposed in and surrounded on substantially all surfaces by said body of semi-insulator material between said first and second regions of said semi-insulator body and in the form of a grid of P-type semi-insulator material;

(e) a region of P-type semi-insulator material disposed on a surface of said body of semi-insulator material and extending down into said body so as to surround said internal region thereof and making electrical contact with a portion of said internal region, said internal region being spaced from said last-named region of P-type semi-insulator material except for the portion thereof contacted by said last-named region;

(f) and electrical connections to the surface portions of said P-type region and to said first and second N-type regions.

References Cited

UNITED STATES PATENTS

| | | | |
|---|---|---|---|
| 3,035,186 | 5/1962 | Doucette | 307—88.5 |
| 3,176,192 | 3/1965 | Sueur et al. | 317—101 |
| 3,252,003 | 5/1966 | Schmidt | 307—88.5 |
| 2,790,037 | 4/1957 | Shockley | 179—171 |
| 2,968,750 | 1/1961 | Noyce | 317—235 |
| 3,258,663 | 6/1966 | Weimer | 317—235 |
| 3,274,461 | 9/1966 | Teszner | 317—235 |

FOREIGN PATENTS

| | | |
|---|---|---|
| 1,324,048 | 3/1963 | France. |

JOHN W. HUCKERT, *Primary Examiner.*

R. F. SANDLER, *Assistant Examiner.*